United States Patent [19]

Rutledge et al.

[11] Patent Number: 5,912,659
[45] Date of Patent: Jun. 15, 1999

[54] GRAPHICS DISPLAY POINTER WITH INTEGRATED SELECTION

[75] Inventors: Joseph D. Rutledge, Yorktown Heights, N.Y.; Edwin Joseph Selker, Palo Alto, Calif.

[73] Assignee: International Business Machines Corporation, Armonk, N.Y.

[21] Appl. No.: 08/922,107

[22] Filed: Sep. 3, 1997

[51] Int. Cl.[6] .................................................. G09G 5/00
[52] U.S. Cl. ........................................ 345/156; 345/161
[58] Field of Search ................................... 345/156, 157, 345/158, 159, 161; 273/148 B, 438; 74/471 XY; 200/6 A

[56] References Cited

U.S. PATENT DOCUMENTS

| | | |
|---|---|---|
| 4,313,113 | 1/1982 | Thornburg . |
| 4,318,096 | 3/1982 | Thornburg et al. . |
| 4,367,465 | 1/1983 | Mati et al. . |
| 4,382,166 | 5/1983 | Kim . |
| 4,680,577 | 7/1987 | Straayer et al. . |
| 4,705,942 | 11/1987 | Budrikis et al. . |
| 4,748,441 | 5/1988 | Brzezinski . |
| 4,804,949 | 2/1989 | Faulkerson . |
| 4,879,556 | 11/1989 | Duimel . |
| 4,883,926 | 11/1989 | Baldwin . |
| 5,004,872 | 4/1991 | Lasley . |
| 5,012,231 | 4/1991 | Felsenstein . |
| 5,448,261 | 9/1995 | Koike et al. . |

*Primary Examiner*—Regina Liang
*Attorney, Agent, or Firm*—Whitham, Curtis & Whitham; Stephen C. Kaufman

[57] ABSTRACT

A threshold discrimination filter circuit compares signals output by a graphic input device such as an isometric joystick including strain gauges and a fixed resistance in a hierarchical voltage divider with threshold reference signals and corrects the output of the graphic input device based on previously stored samples thereof when a selection or deselection action by a user is discriminated to values at a time of onset of selection. Onset of selection may be achieved by estimating maximum curvature of a plot of output values over time. Changes in output signals during selection and other signal signatures such as would correspond to a lift are exploited to provide a plurality of selection operations which can be recognized. User actions may be adaptively captured to increase discrimination capability (e.g. resolution) and/or user recognition. Outputs of the graphic input device are supplied directly to a CPU of a data processing device between masking periods so that graphic manipulations such as dragging can be performed while masking unintended change of specified display location during selection and deselection.

32 Claims, 4 Drawing Sheets

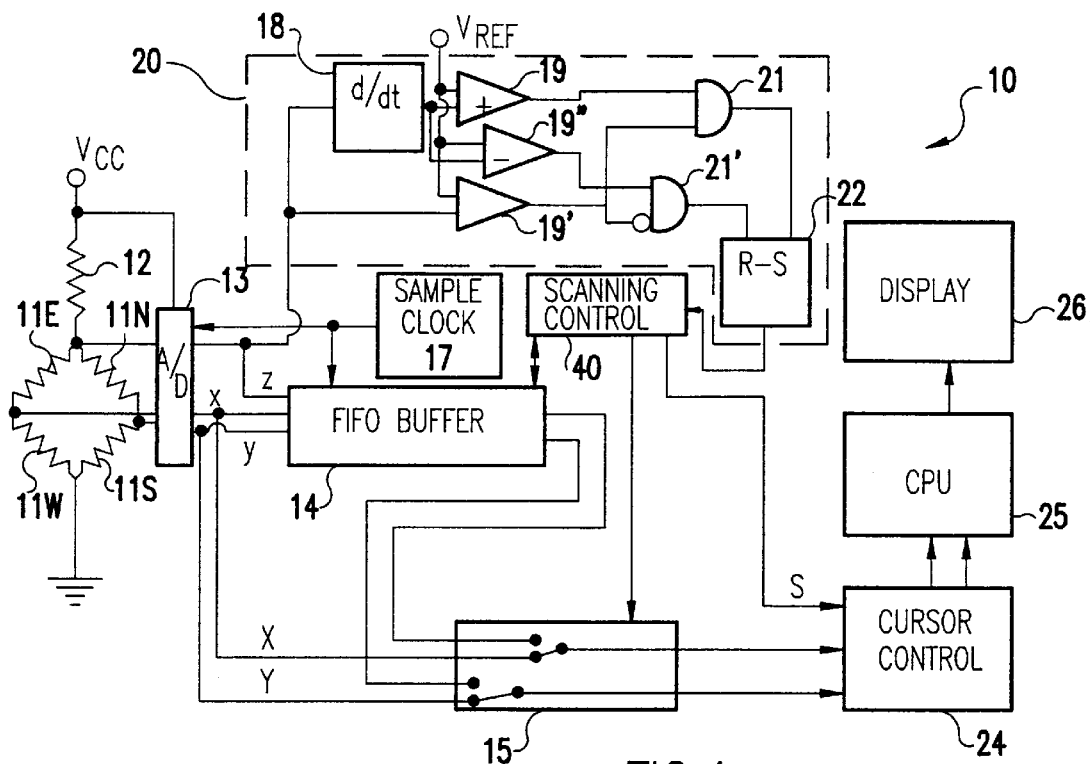
FIG.1
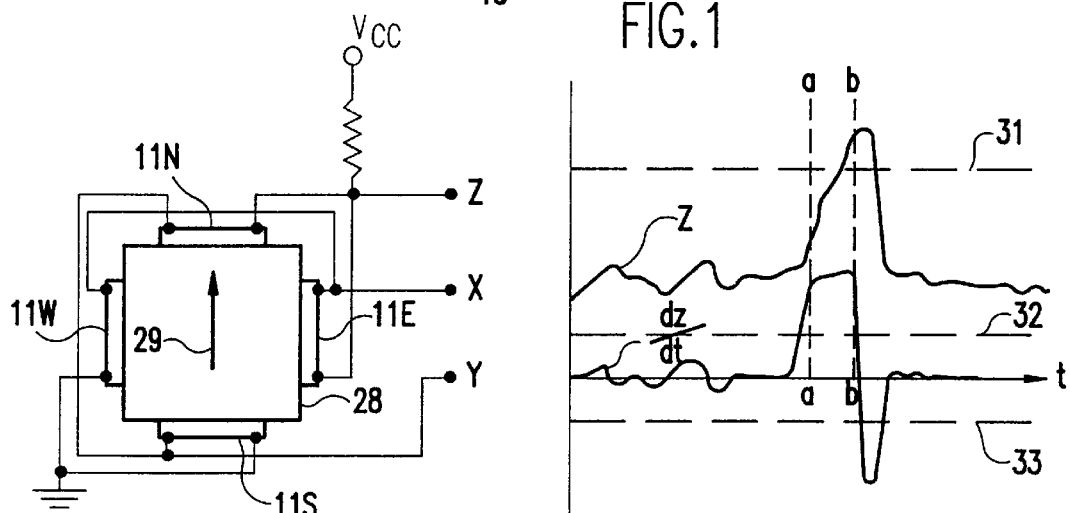
FIG.2
FIG.3
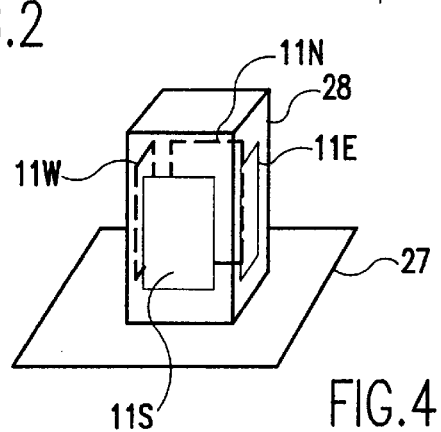
FIG.4

GRAPHICS DISPLAY POINTER WITH INTEGRATED SELECTION

CROSS-REFERENCE TO RELATED APPLICATIONS

This application is related to U.S. patent application Ser. No. 08/340,935, filed Nov. 17, 1994, assigned to the assignee of the present invention and now allowed.

BACKGROUND OF THE INVENTION

1. Field of the Invention

The present invention generally relates to graphical pointing devices for indicating locations on a display such as cursor controllers and, more particularly, to devices capable of pointing to and/or selecting locations on a display and/or manipulating displayed images such as icons or other indicia which may be displayed at such locations.

2. Description of the Prior Art

In the field of computers and data processors, it has long been recognized that the capability of a user to receive and assimilate information in order to interact easily with the computer is of major importance in the usefulness of the computer in many applications. The utility of increased "computing power" to execute programs at ever increasing speeds diminishes in all but a relatively few highly complex programs which require only slight interactivity with a user when the user cannot readily perceive, understand and react to the results thereof. Therefore, the interest in and dedication of a significant fraction of available computing power to the user interface has become a widely accepted practice for both hardware and software design in the data processing field. In recent years, it has also been found that displayed graphics images, especially if manipulable by the user, provide a particularly good medium for both the communication of information to the user including processor and program execution status and for the input of user control information and data.

Input of control signals and data through the medium of a graphic display requires the use of a device by which a location on the display may be specified and a separate mechanism for selection. This latter requirement is imposed by the requirement of positional feedback to the user by display of a cursor, icon or the like so that the operator can control the specification of a location without inputting of data or exercising control until the location is correctly specified. In the past, this has been accomplished with various devices which have become well-known and which are in widespread use, such as the mouse, light-pens, track-balls (essentially an inverted mouse which does not meed to be moved across a surface), gimballed and isometric joy-sticks and many special purpose arrangements such as adaptations to accommodate various physical disabilities of the user which will hereinafter be referred to collectively as graphic input devices.

Typically, these devices will include one or more buttons (e.g. the well-known one-, two-, or three button mouse) or switches by which a control function can be effected once a location on the display has been correctly specified to the user's satisfaction. Occasionally, a mechanism such as a treadle switch is employed which is entirely separate from the apparatus used to specify a location on the display. In any event, both types of control (e.g. location and selection) must be provided.

In recent years, there has been not only a trend toward miniaturization and portability of data processing devices but also toward ergonomic design and "human engineering" so that the devices may be operated in a manner which may be more familiar to a user. A major difficulty with miniaturization is the size of input devices, such as a keyboard which rapidly become less acceptable as size is diminished. This need for smaller input arrangements has led to the development of so-called pen computers in which data may be entered by an act similar to writing on paper in a notebook. For the same reason, trackball devices which may be included in the housing of the portable computer and do not require a separate surface for operation by a user are often included. More recently, isometric joysticks which do not significantly move but control cursor motion in response to force applied thereto have appeared in commercially available devices.

Regardless of the degree of miniaturization which may be possible, the requirement of separate means to provide the separate functions alluded to above requires separate space which must be compatible with the physical size of a user. Therefore miniaturization is limited by this practical limitation which is independent of any design feature of the data processing device itself. The only alternative to the provision of separate controls is to combine the functions of devices which sense the user's actions. When this is done, separation of functions is difficult.

For example, if a pressure or force sensor is included in a stylus-like position control device, such as a light pen or joy-stick, alteration of force during normal motion over the display often causes unintended selection even though a separate sensor on an axis orthogonal to other sensors is provided. Conversely, the user's action in changing force applied against the display usually causes small but often significant change in the location specified. These problems are generally associated with the fact that a stylus will not often be naturally or comfortably held in a position in which its axis is perpendicular to the display. For example, a correction technique for use with a light pen or touch screen where positional errors were caused by lifting of the pen (for selection only) in a direction not precisely orthogonal to the display screen is disclosed in U.S. Pat. No. 4,558,313 to Garwin et al., which is hereby fully incorporated by reference. This latter difficulty is also characteristic of the well-known gimballed joy-stick (which is not likely to be in a neutral or "vertical" position when a location is being specified) or a mouse in which the natural stroke of a finger on a button is not perpendicular to the surface on which it is moved (or, alternatively, the stroke of the button motion is inclined in the interest of a more natural feel to the user).

These problems in the practical use of graphical input devices have proven quite intractable, particularly as increased degrees of miniaturization have been attempted. Further, attempts to facilitate or enhance separation of functions by sensing of force, with or without electronic processing of the transducer output, has met with little success due, at least in part, to the differences in force applied by different users in the comfortable actuation of the device and/or variation in the nature of actions by even a single user. For example, the amount of force applied to a stylus by a user may vary greatly with stress: when successful tracking of position is not being achieved, it is a natural reaction to increase force of the stylus against the display, even though the degree of force already applied may be the reason for incorrect tracking.

All electronic processing of signals from transducers in graphic input devices attempted in the past for detection of selection has also been complicated by the need to accommodate sensing of a change in location specified by the user during periods of selection for common display manipulations such as "dragging" of an object. During such operations, the signals from the transducers must necessarily change because of the operator manipulation for positional input. These signal variations may complicate the detection of selection and deselection. Further, force applied to a stylus or selection button by an operator may vary widely (due, for example, to irregularities in the surface over which the pointing device is moved or as an incident of the changing positional input by the user) and rapidly while applied force remains relatively high.

Accordingly, such operations have been difficult without the provision of separate selection and position input arrangements.

SUMMARY OF THE INVENTION

It is therefore an object of the present invention to provide a reliable method and apparatus for detecting a "selection push" in a graphical input device which integrates positional and selection input functions.

It is another object of the invention to provide a method and apparatus for specifying and selecting a position on a graphic input device in which the selection function does not disturb the location specified.

It is a further object of the invention to provide a method and apparatus for automatically canceling unintended effects in the operation of a graphic input device by a user.

It is yet another object of the invention to provide for the achievement of the above objects while allowing for change of position selection during selection such as for dragging of objects on the display.

It is a yet further object of the invention to provide an apparatus and method for reliably separating location specification and selection functions in a graphic input device utilizing transducers which are common to both functions.

It is another further object of the invention to provide a plurality of selection functions, including user identification, singly or in combination by detection of signatures of graphic input device actuation signal patterns and/or signatures which may be adaptively developed.

In order to accomplish these and other objects of the invention, a graphic input arrangement is provided including a cursor control circuit, an arrangement for developing first, second and third respective signals corresponding to force applied to a graphic input device in any of three orthogonal axes and supplying at least two of said first, second and third signals to the cursor control circuit, a buffer for storing at least one of said first, second and third signals, a comparison arrangement for comparing an amplitude of at least one of the first, second and third signals with a reference value or preferably a running average of the same value and providing a first output to discriminate a selection from among a plurality of possible selections, and an arrangement responsive to the comparison arrangement for supplying correction values corresponding to said first, second and/or third values corresponding on an onset of selection.

In accordance with another aspect of the invention, a method of controlling an image on a display is provided including the steps of storing samples of an output of a graphic input device, discriminating occurrences of selection from among a plurality of possible selections and deselection of a location with a graphic input device, and generating corrections to the output of the graphic input device based on stored samples of an output of the graphic input device surrounding occurrences of selection and deselection.

BRIEF DESCRIPTION OF THE DRAWINGS

The foregoing and other objects, aspects and advantages will be better understood from the following detailed description of a preferred embodiment of the invention with reference to the drawings, in which:

FIG. 1 is a schematic diagram of an exemplary transducer and signal processing circuit preferably employed in the invention, FIG. 2 is an axial cross-section in schematic form of the graphic input device in accordance with a preferred embodiment of the invention, FIG. 3 is a graphic depiction of the signal processing performed on the transducer output signals in accordance with the exemplary circuit of FIG. 1, FIG. 4 is a perspective view of a preferred embodiment of the invention.

DETAILED DESCRIPTION OF A PREFERRED EMBODIMENT OF THE INVENTION

Figure 5:
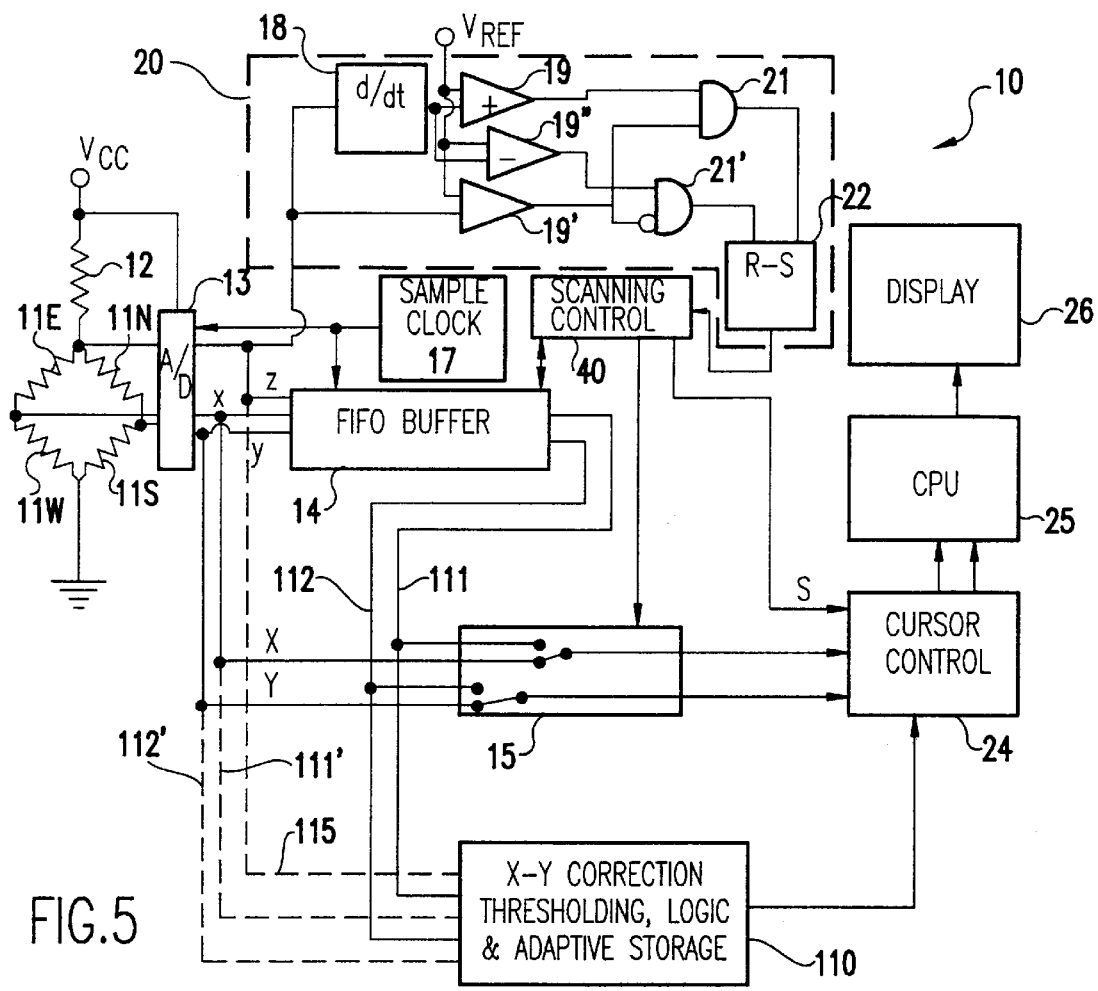
FIG. 5 is a block diagram of a preferred embodiment of the invention providing multiple possible selection alternatives, FIG. 6 graphically depicts a multiple condition selection function in accordance with the preferred embodiment of the invention shown in FIG. 5.

Referring now to the drawings, and more particularly to FIG. 1, there is shown, in highly schematic form, a transducer circuit including signal processing circuitry in accordance with a preferred embodiment of the invention. The transducer arrangement is preferably embodied as a group of four strain gauges arranged in pairs 11E, 11W and 11N, 11S affixed to the lateral sides of an upstanding rectangular prism 28 of slightly flexible material affixed to a base 27 to form a small joystick as shown in plan view in FIG. 2 and in perspective view in FIG. 4. The material should preferably feel rigid to the user who should feel little, if any, motion as the user applies force thereto but must flex adequately to cause some distortion of the strain gauges at comfortable levels of force. This structure is particularly useful in and appropriate to an isometric joystick of the sort commercially available and commonly referred to as a "pointing stick". However, it is to be understood that the nature of the transducers and their mechanical arrangement are not important to the practice of the invention and the arrangement shown in FIG. 2 is to be considered both exemplary and schematic.

The strain gauges themselves are preferably of the metal foil type which is commercially available from several sources and well-known in the art. Application of force to the strain gauges causes a dimensional change in the conduction path therethrough and thus alters the resistance of each strain gauge in a highly predictable manner also well-understood in the art. In the arrangement shown in FIG. 2, a force applied in the direction of arrow 29 will cause the resistance of transducer 11N to decrease due to compression and the resistance of serially connected transducer 11S to increase due to tension by approximately the same amount so that the series resistance of the pair of transducers remains approximately constant while the voltage at node Y will increase. A similar result would occur with force applied orthogonally to direction 29 (but still in the plane of the page) in regard to transducers 11E and 11W to alter the voltage on node X. Thus, any force vector in the plane of the page of FIG. 2 can be detected by its differential effects on the strain gauges; in this case developing a signal for each pair of strain gauges by a voltage divider action.

An important aspect of the present invention is that the total series resistance of each pair (e.g. 11N, 11S) of strain gauges remains substantially constant as long as the force applied to shaft 28 remains substantially in the plane of the page of FIG. 2. Therefore, the further voltage divider formed by resistor 12 and the pairs of transducers is substantially unaffected.

However, any relative force component applied to shaft 28 perpendicular to the plane of the page will cause dimensional change of all four transducers 11N, 11S, 11E, 11W by applying a component of force in compression to all of them and changing (e.g. decreasing) their resistance. Accordingly, the voltage on node Z may be made to change due to the further voltage divider formed by the pairs of strain gauges and resistor 12.

Referring again to FIG. 1 it is to be noted that the signals indicating the relative force components applied to shaft 28 (whether analog or digital and regardless of the type of transducer employed) are preferably derived as ratios of signals on various nodes X, Y and Z. That is, the force components in the plane of the page are derived from the ratio of the signal value on exemplary node X and/or Y to the signal value on node Z. The force component perpendicular to the page is derived as the ratio of the signal value on node Z to Vcc. In other words, in the exemplary preferred form of the invention, the signal value on node Z is used as a reference voltage for developing signals reflecting the force vector in the plane of the page and Vcc is used as a reference voltage for developing a signal reflecting the force perpendicular to the page (hereinafter referred to the Z-direction), preferably using a plural channel analog-to-digital (A/D) converter 13 of any known type to increase noise immunity. A/D converter 13 is also preferably gated by a sample clock 17 to provide synchronous sets of force vector output signals x, y and z.

Incidentally, the variation in signals from the strain gauges are quite small and substantial amplification (e.g. about 500 times) is generally required, as is understood by those skilled in the art, prior to A/D conversion. This amount of gain also implies that a calibrated reference voltage source should be used as well as other precautions against electrical noise.

The x and y force vector signals are preferably then provided, through switching circuit 15, to a cursor control circuit 24, the details of which are unimportant to the practice of the invention. In accordance with established protocols, the cursor control circuit converts the x, y and s (select) signals into motion messages and transmits them to the CPU. The conventional source of the signal s is a switch, such as a mouse button, which is pressed to indicate a selection. The force vector signals x and y and also preferably z are also, in accordance with the preferred embodiment of the invention, provided to and temporarily stored in buffer 14 of suitable length (e.g. about fifty samples) which provides a first in-first out function synchronized with the sample clock 17 for the x, y, z force vector signals. The buffer 14 is processed by the scanning control 40, when the latter is activated by trigger circuit 22, as described below. The result of this processing is supplied to switching circuit 15, which is also activated by scanning control 40.

The thresholding circuit 20 in accordance with the invention receives the z force component signal from A/D converter 13 and performs signal processing thereon which not only provides discrimination of selection signals (produced by intentionally applying an increased force to the shaft 28 orthogonal to forces used to control cursor location) from ordinary and unintended variation during operation of the graphic input device but also, in combination with buffer 14, provides correction of position to the position specified at the onset of selection and accommodates dragging actions by the user, as alluded to above.

More specifically, intended selection is discriminated by comparing both the amplitude and time-rate of change of amplitude (derived by differentiator circuit 18) of the z signal with a plurality of reference signals, collectively represented by Vref, in comparators 19, 19'. Essentially, this function is that of a filter to distinguish between large and rapid changes in the z value from smaller changes which are normally encountered in manipulating of the pointing device. The reference signals can also be adaptively altered by storage of samples by any of many known techniques as well as filtering, illustration of which is omitted from FIG. 1 in the interest of clarity. The comparators 19, 19' are preferably configured (in the simplest case) to provide a logic level output depending on whether the input is above or below a threshold.

Referring to FIG. 3, exemplary values of z and rate of change of z over time (dz/dt) are plotted as a function of time. The value of z is shown having a fluctuating positive value, indicative of normal force and variation thereof applied by the user in the Z direction in ordinary operation of the graphic input device. The time-rate of change also fluctuates accordingly but at a relatively low level about a zero average value.

Now, assuming at time a the operator has successfully specified a position with the cursor or other display indicia, such as an icon, and wishes to make a selection by applying additional force to the graphic input device in the Z-direction. As shown, such force causes a sharp rise in both z and dz/dt. When both of these values have exceeded respective thresholds 31 and 32, the outputs of comparators 19, 19' will assume the same logical value which is detected by a coincidence circuit depicted as AND gate 21. The output of AND gate 21 is then applied to a toggle circuit 22 such as a set/reset flip-flop which essentially assumes and holds the state to which it is last positively driven. The form of this coincidence circuit is not important to the practice of the invention.

Similarly, the outputs of comparators 19', 19" are combined as depicted at AND gate 21' which has an inverting input for receiving the output of comparator 19'. Comparator 19" applies a negative threshold, depicted at 33 of FIG. 3, to the dz/dt signal. Thus, AND gate 21' develops a logic output to reset toggle circuit 22 when z is below a threshold and rapidly decreasing (dz/dt is negative), as shown to the right of time b in FIG. 3, signifying an intended release of a portion of the force applied in the Z-direction to the graphic input device by the user.

The output of toggle circuit 22 is communicated to scanning control 40 to indicate that a user selection has been discriminated. However, as indicated above, the application or release of force from the graphic input device invariably causes an unintended motion which is also reflected in the x and y signals.

The decision that a selection has occurred which causes setting of toggle circuit 22 occurs at some time after the initiation of the selection action by the user, when the 2 signal begins to rise. In the interim, a number of motion messages x', y' may have been sent to the CPU 25 through cursor control 24, so that the cursor may have been moved to a position different from that at which the increase in the Z-direction force was initiated and at which location selection was intended. It should be noted that x' and y' are relative motion signals (e.g. a number of increments in either or both coordinate directions) and cursor control circuit 24 has no location information at any time. Therefore, any corrective action must be limited to either detecting and reporting a specified time at which selection occurred and/or a message to reverse the motion which occurred since the time of selection together with selection after that corrective reversal of motion. In the latter case, there is the additional difficulty that the CPU action resulting from motion messages during detection of a selection may not be reversible. For example, if the cursor is at the edge of a screen or window, the motion messages may have been ignored and reversing the motion messages sent to the CPU would result in a positional error. However, this condition is relatively rare and may be tolerable to allow the invention to function with a standard mouse driver. The former alternative is unlikely to generate such an error but implies a need for a special mouse driver. The circuit of FIG. 1 is generic to both alternatives or a combination thereof, depending on the behavior of the scanning control 40, as will be discussed below.

It should be noted that corrective action is taken in a similar manner upon detection of deselection, as well. As long as the user maintains an increased force on the graphic input device in the Z-direction, toggle circuit 22 will remain in the set state and the selection signal continues to be provided to cursor control circuit 24 until toggle circuit 22 is reset in response to a sudden decrease of force in the Z-direction.

At a high level, the function of scanning control 40 is to identify the point in the sequence of stored x, y and z signal samples in buffer 14 at which a user action occurred which caused a change of state of toggle circuit 22 and to control generation of signals x, y and s which will reverse any unintended motion accompanying that action. To accomplish this, whenever the scanning control circuit 40 is activated by a change of state of toggle circuit 22, the scanning control circuit scans the contents of buffer 14 to identify the beginning of the sudden change in the z signal (e.g. the beginning of the rise in dz/dt) and totals the motion occurring after that time. This may be readily accomplished by, for example, simply scanning backward until a relatively stable low value of z is found and outputting the corresponding x and y signals. Alternatively, the motion signals may be accumulated in the scan control circuit 40 and a net corrective motion signal generated. When such a stable low value of z is found and subsequent to the generation of corrective motion signals and transmission thereof to cursor control circuit 24 through switching circuit 15, a selection signal is generated and transmitted to the CPU 25 through cursor control circuit 24.

Alternatively, if cursor control circuit 24 or CPU 25 is arranged to temporarily store a time stamp for each cursor movement command, it is only necessary for the scan control circuit 22 to determine the time of the selection and provide that information to the CPU 25 in order to take appropriate corrective action. In this case, buffer 14 would not be required to contain x and y sample values but storage of equivalent motion commands together with time stamps would be provided in either cursor control circuit 24 or CPU 25. Once the time of onset of selection or deselection is determined, a corrected position can be found by locating the cursor position at a corresponding time. In either case, the onset of the selection is determined by scanning through samples of z values in buffer 14 with comparison or other processing for detection of a stable low z value as described above. While several suitable techniques for determining a corrected cursor location have been described, it should be understood that other suitable techniques will be apparent to those skilled in the art in view of this description of the invention and that the above described techniques are not critical to the practice of the invention but merely preferred variations thereof. For example, in place of the stable z value sought above one might use the point of onset of a rapid increase in the z force, identified as the intersection of lines of markedly different slope which approximate adjacent sections of a z value-versus-time plot.

It should be noted that the constitution of thresholding circuit 20, as described above, should be considered exemplary and numerous modifications and different signal processing circuitry could be used to accomplish the functions of sensing both the amplitude and rate of change of amplitude of the force applied in the Z-direction and comparing the sensed values against a threshold. Further, it should be noted that the discrimination of an intentional change in force in the Z-direction is not completed until the z signal reaches a predetermined amplitude and a slow increase in force may defeat the above-described discrimination. For this reason, it may be desirable to add a further comparator to sense only force in the Z-direction but at a higher threshold. By the same token, the time for discrimination to be done will vary with the rate of increase of force applied by the operator and the buffer must contain a sufficient number of stages to contain samples over the full range of durations which may result in discrimination of a selection by the user.

Additionally, it is to be understood that the filtering arrangements for detection described above reflects a very simple form of the invention in accordance with basic concepts thereof. Other filtering arrangements, preferably also implemented with comparators, can allow discrimination of onset of selection based on other signal characteristics (e.g. signatures) which may be present. By the same token, other forms of selection to provide additional or differentiated functions can be discriminated based on such characteristics by appropriate filtering in accordance with anticipated or adaptively developed signal signatures.

For example, even in the simple embodiment of the invention described above in which a correction signal is developed for the x and y directions by detecting the onset of a sharp change in the signal reflecting pressure in the z direction (e.g. a quick press which may include some angular component in the x and/or y direction), the correction signal developed as described above may allow useful information to be contained therein.

In a simple arrangement for detection of such useful information, as shown in FIG. 5, the x and y correction signals 111, 112, derived from stored signals in the FIFO buffer 14 covering the period of time from onset of selection until selection is detected are preferably subjected to thresholding 110 (e.g. individually, as their sum or, preferably, as the sum of their squares, as may be readily accomplished from the stored digital signals in many ways familiar in the art). In the case of thresholding being applied to the sum of the squares of the correction signals in the x and y directions, an angular component of pressure will be discriminated as a vector falling inside or outside area 120 defined in accordance with a circular boundary 120', shown in FIG. 6, corresponding to the threshold applied. If the vector falls outside area 120, the magnitude and sign of the x and y correction signals can then be evaluated to discriminate particular areas such as 121, 122, 123, 124 as additional usable selection possibilities. For example, these areas could be made to functionally correspond to combinations of actuations of mouse buttons, allocating, for instance, areas 120 and 123 to correspond to mouse button 1, area 121 to simultaneous actuation of mouse buttons 1 and 2, area 122 to mouse button 2 and area 124 to mouse button 3. Other possible allocations or input functions will be evident to those skilled in the art from this example.

Figure 6:
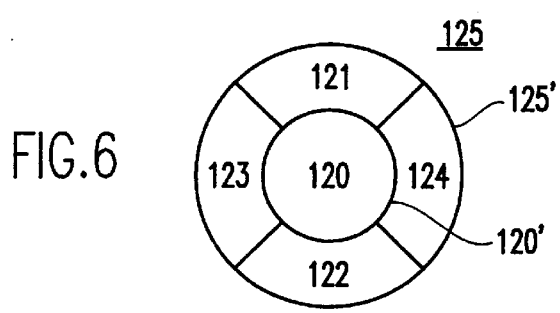

It should be recognized that the depiction of FIG. 6 should, more properly, be considered as a projection onto a plane of regions of a surface of a unit sphere through which a vector may mass onto the plane of the page and is so depicted for clarity. Boundary 125' is established by threshold 31 discussed above in connection with FIG. 3 and would correspond to a line some relatively small distance below but parallel to the "equator" of such a unit sphere. Vectors having only a small z component (e.g. corresponding to the pressure necessary to impart a motion in the x and/or y direction) would result in a vector passing through region 125 of FIG. 6 and, being below threshold 31 of FIG. 3, would not be discriminated as a selection at all.

It should also be recognized that press gestures by a user are not ideal and that capturing the directional components of a vector can be done in many ways. A particularly simple approach would be to simply capture the x, y and z values at the outputs of A/D converter 13 when a press or selection is detected (as opposed to the onset thereof) over connections depicted by dashed lines 111', 112' and 115. It should also be noted in this regard that the selection or "press" discrimination remains a function of the signature of the z values over time and, if sufficiently great (e.g. sufficient pressure is exerted in the z direction), a vector passing through area 125 cannot occur consistent with a selection and one of areas 121–124 will be reliably selected by the user if the force in the x and/or y direction is sufficiently great in comparison therewith. This is a very natural action on the part of a user and selection can be performed with great reliability and repeatability.

Alternatively, especially if additional selection areas of smaller angular extent are desired (e.g. by providing an additional threshold between 120' and 125' and/or more sectors in the circumferential direction), a user's motions over the history of a selection operation may be captured and adaptively established as a signature comprising one or a plurality of vectors over a short period of time corresponding to each selectable area preferably captured and stored in a memory included in element 110. Signature or template capture and matching are well-developed for speech recognition although the invention can be practiced with many fewer samples and much lower resolution than required for speech recognition applications. (For example, ten to fifteen data points over a few hundred milliseconds are generally sufficient to characterize a users motions for intended selections.) By the same token, adaptively captured press motions could be advantageously employed for user identification (e.g. for security) and, in accordance with the invention, is advantageously coupled with a selection or input process. Thus the input or selection process can be readily aborted if the motion peculiar to an authorized user is not recognized.

Figure 11:
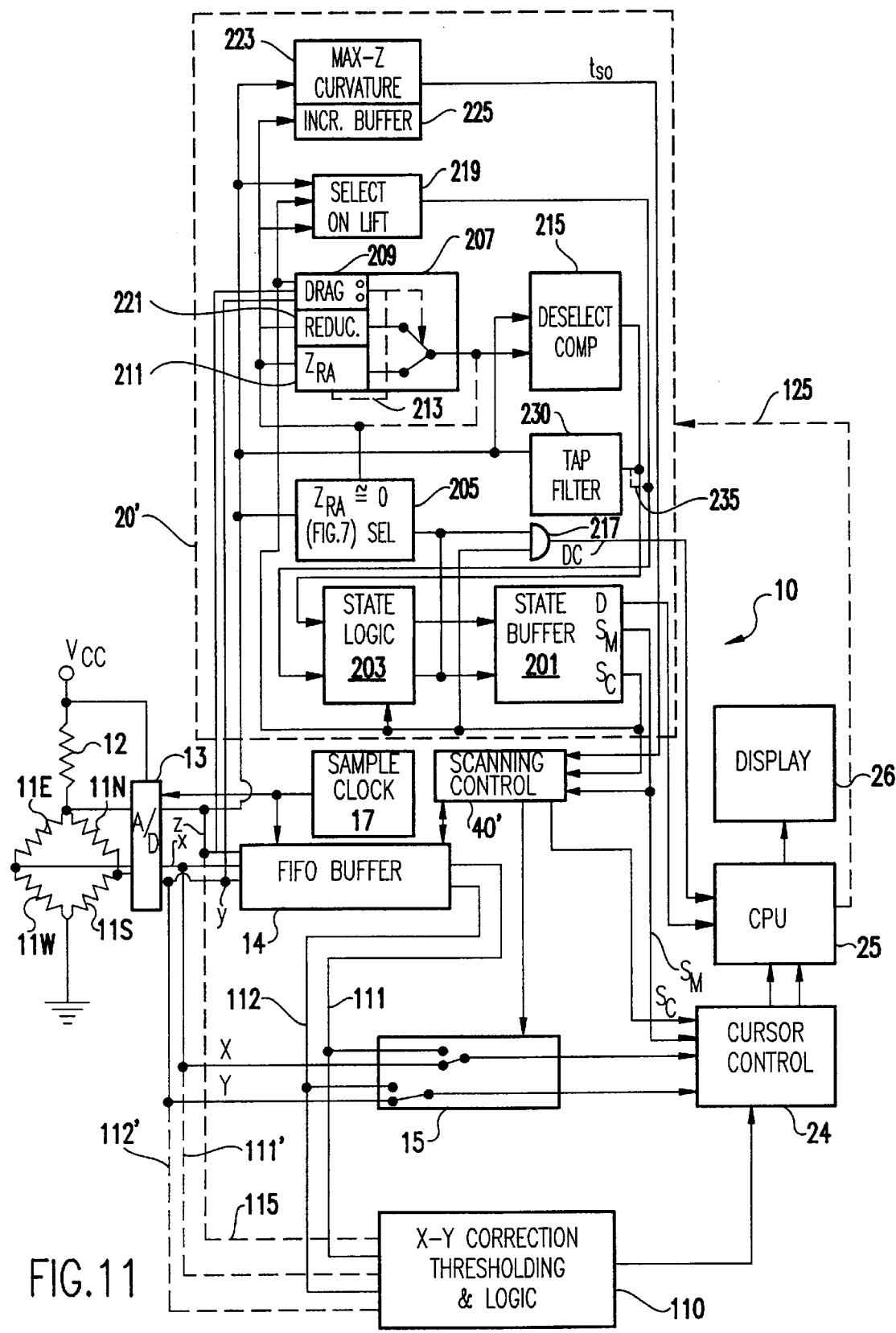
FIG. 11 is a block diagram illustrating a variant form of the preferred embodiment including preferred structures includable singly or in combination in a filter for recognizing signal signature features, and FIG. 12 graphically depicts a preferred technique for estimating an onset of a selection operation in accordance with the variant form of the invention of FIG. 11.

Likewise, thresholding circuit 20 which serves to detect a selection is described above with reference to a particularly simple suitable structure to convey the principles of the invention and to readily enable its practice. A more generalized view of this arrangement which is currently preferred and includes arrangements for providing currently preferred variations and perfecting features of the invention, which will be described below, is shown in FIG. 11. Thresholding circuit 20 may be more generally considered as a filtering circuit 20' which detects or filters features of signals output by A/D converter 13 (or, more generally, input device 11, 12). Since the signals are preferably in digital form, digital filtering is readily performed by any of a number of techniques of comparison with stored or easily computed reference values which are well-understood by those skilled in the art and which need not be discussed or illustrated in detail.

As an incident of detection of such signal features, the status of selection or deselection may be considered and a three or more state status buffer 201 capable of providing outputs indicative of a selection state $S_C$ (e.g. potentially continuous, as controlled by a user), a momentary selection $S_M$ (e.g. returning to a deselect state after an arbitrary time period) and a deselection signal D is substituted for the two-state set/reset output flip-flop 22 of FIGS. 1 and 5, discussed above. Logic 203 is also provided for implementing the inclusion in the detection process of selection/deselection status, including combination of detected conditions, time constants, signal inversion and the like, as necessary, which can be implemented in many ways well-understood in the art and not critical or particularly important to the practice of the invention.

For example, it is irrelevant to the practice of the principles of the invention whether the arbitrary time period for momentary selection alluded to above is considered as being implemented as part of state buffer 201 or state logic 203 and, in any event, numerous techniques of imposing a time constant on a logic signal (e.g. an RC circuit on one input of an AND or NAND gate or counting clock periods) are well known in the art.

It should also be understood from the following discussion that less than all the preferred features which will be discussed below and/or variations thereof singly or in combination may be included in the practice of the invention. Similarly, it will be recognized by those skilled in the art from the discussion of the invention that the deselect signal D will be mutually exclusive of the continuous and momentary select signals and therefore the latter can be considered as carrying deselect information for use by scanning control 40, 40' and/or cursor control 24. Therefore, the connection of the deselect signal D thereto is not necessary but may simplify implementation of state logic 203 or other elements illustrated in FIG. 11. Likewise, the illustrated connection to CPU 25 should be considered as somewhat arbitrary and unimportant to the practice of the invention except to the extent that the elements illustrated as constituting filter 20' may be partially or fully implemented in software on the CPU 25 as indicated by dashed arrow 125 and in which a discrete deselection state may provide some convenience as a condition of a branch or the like.

Figure 7:
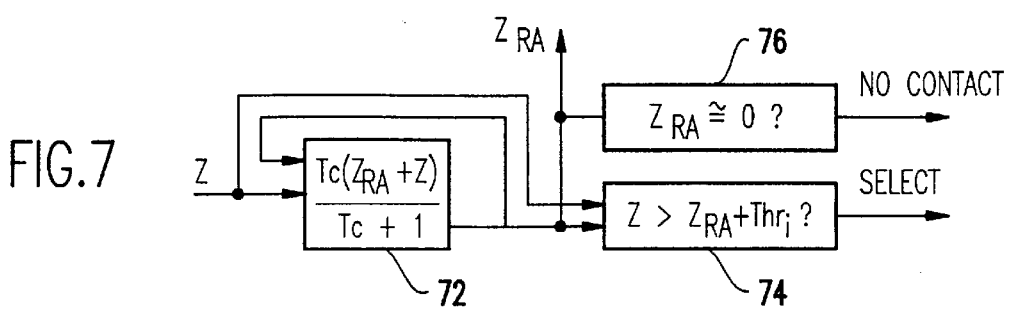
FIG. 7 is a block diagram of a preferred form of detecting a selection function, FIGS. 8, 9 and 10 graphically depict signal signatures discriminated in accordance with a variant form of the invention.

A preferred method of discriminating a selection and imposing threshold 31 in a manner which does not require computation of dz/dt is simply to maintain a running average Zra of z values by computing for each (e.g. the n-th) sample, for example, $Zra_n=(Tc*Zra_{(n-1)}+Z)/(Tc+1)$, as illustrated at 72 of FIG. 7, where Tc is the "time constant" of (e.g. the number of samples over time considered or included in) the running average. Then, a selection can be detected when Z changes rapidly and Z becomes greater than Zra+Thr, as illustrated at figure 74 of FIG. 7, where Thr is a threshold which now has the combined function of thresholds 31 and 32 of FIG. 3 since it represents a force and a rate of change of force (in the comparison with the running average) for each sample of z. This technique also fully compensates for relatively slow changes in cursor control manipulation pressure which may vary over a relatively large range with, for example, stress or fatigue of the user.

These computations are rapidly executable and do not contribute significantly to processing overhead of even small, portable computers. A selection is also potentially discriminated in a single sampling interval, reducing the length required for FIFO buffer 14 and complexity of the scanning operations otherwise needed to derive the x and y corrections. (The onset of selection can still occur several sampling intervals earlier than the detection of selection is discriminated.) Further, this technique adaptively compensates for noise and user touch in the z signal and reduces the need for a period of relative stability in the z signal (which can be further reduced or avoided as will be discussed below). Further, provision of such a computation allows the running average, Zra, to be used in discriminating other conditions and to provide for detection of periods in which the cursor control is not being actively used (when it is to be expected that the running average will fall to substantially zero) which can be similarly used to advantage in deriving other useful selection functions and user convenience or accommodation as will be described below.

A release may be detected as an additional form of detection in much the same manner when there is a rapid decrease in z compared to Zra. However, if a "dragging" function or other function responsive to a continuing select condition is to be provided, as would generally be the case at the present time, recomputation of Zra is preferably inhibited during the period over which selection continues to avoid a need to continually increase pressure during selection to avoid erroneous sensing of deselection.

Detection of a continuing selection is illustrated at 209 of FIG. 11, responsive to signal $S_C$ from state buffer 201. A dragging operation is detected in response to a change in the x and/or y signal during the continuance (after detection) of signal Sc. Upon the detection of either condition, the value of Zra is stored in, for example, register 211, as indicated by dashed arrow 213. This stored value of Zra is then provided to a deselect comparator 215.

Figure 8:
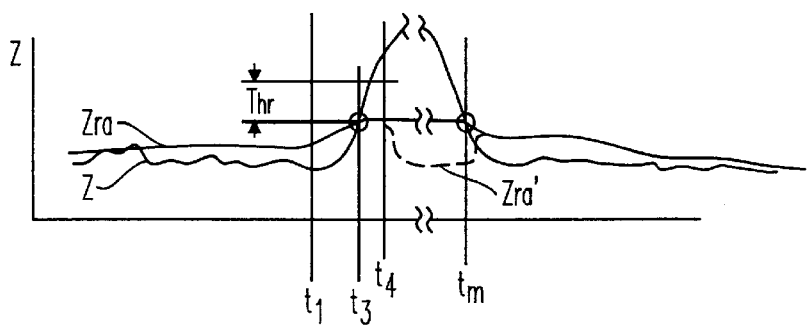

This operation is functionally illustrated in FIG. 8 in which Z (including some noise) and Zra (in which noise effects are reduced) as graphically depicted. At time t1, the onset of selection occurs and both Z and Zra begin to increase. At t3, Z=Zra but is increasing more rapidly than the running average. By time t4, Z exceeds Zra+Thr and selection is discriminated, for example, only three sampling intervals after selection onset. If Z>Zra at the onset of selection, selection would exceed Zra+Thr and be discriminated even more rapidly. During the period of selection, t4–tn, Zra is not recomputed and does not increase. Deselection at tn is preferably discriminated when Z falls below Zra at the value at which it is frozen and stored at 211 during selection.

Figure 9:
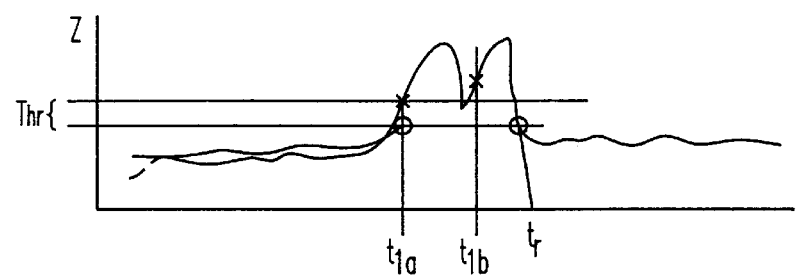

The use of a "double-click" of a mouse button has become a distinguished user gesture for exerting control over a processor. Ideally, this is performed by two rapid pressing motions separated by a complete release. However, users executing such a gesture often do not make a complete release between pressing actions (referred to as the Jenks phenomenon), resulting in unreliable recognition of the intended gesture. As illustrated in FIG. 9, the computation technique including a running average (enhanced by freezing of Zra during selection) overcomes this difficulty in accordance with the invention by allowing detection of the second pressing action (corresponding to a selection) at 205 by the Z value exceeding Zra by more than a threshold value at t1b after falling below Zra+Thr during a continuing selection by, for example, ANDing $S_C$ with the select output of 205 at 217 to develop double-click signal DC even though no deselection (e.g. tr) has been detected. (If an intervening release or deselect is detected, the double-click will be detected by the CPU 25 in the usual manner.) Any number of select operations can thus be performed "on-the-fly" in a manner largely insensitive to completeness of reduction or lifting of z force between detected pressing operations. In other words, the compensation for or accommodation of the Jenks phenomenon in accordance with the invention provides the additional function of, for example, indicating intermediate points in a drag operation, as might indicate intermediate positions of structure or motion in a graphic image.

As a perfecting feature of the invention, it is also possible to discriminate a selection by release of pressure in the z direction. It will be recalled that a minimum but significant amount of force is required to maintain frictional engagement of, for example, the user's finger with the cursor control device/isometric joystick to impart x and y forces thereto. Thus a sharp release of the z force when a selection is not otherwise in effect may also be used to control a momentary selection operation (which may be functionally different from a selection carried out by increasing force and may be especially useful for acquisition of a displayed target).

This feature of the invention is depicted at 219 of FIG. 11 which could, for example, be comprised of a comparator (relative to zero or Zra) or AND gate which is enabled by the inactive state of signal $S_C$. A time constant or threshold relative to Zra is preferably applied to the z input to inhibit actuation or detection if pressure release is slow. However, in a "select on lift" operation, it matters little whether the threshold is applied relative to Zra or the z force value (e.g. zero) indicating no contact of the user with the cursor control device/isometric joystick. Direction of crossing of a threshold below a running average could also be detected but the threshold would then be constrained to a value in excess of the noise (e.g. unintended variation in user touch pressure) in the z signal.

Figure 10:
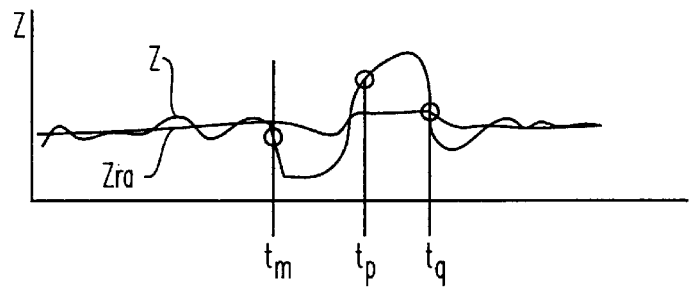

This feature of the invention is functionally illustrated in FIG. 10 in which z falls rapidly compared to Zra (which is assumed in the implementation to be a non-zero value indicating user contact so that a release can, in fact, occur) at tm. For comparison, a selection by pressing, as described above is illustrated at tp and a subsequent release/deselection is depicted at tq.

Conversely, a tap filter 230 to force deselection or prevent discrimination of an unintended selection can be implemented by providing for detection of the combination of opposite conditions: a rapid rise of the value of Z above Zra+Thr but where Zra is substantially zero or approaching that value due to Z being substantially zero over a number of sampling periods immediately prior to the rise of the Z value (e.g. a momentary application of force after a period of no contact with the graphic input device). A tap filter is potentially useful consistent with optimal simplicity and convenience of implementation of the invention since an isometric joystick is often placed between keys of an otherwise standard keyboard and may be inadvertently struck when no cursor control or selection is intended. Alternatively, a tap filter may be considered a detecting a signal signature corresponding to a preference of some users to execute a selection gesture as a tap (indicated by dashed line 235 to force a selection). In either case, selective disablement at the option of the user should also be provided. Such disablement can be provided in either the set up of any application or the operating system of the data processor or, preferably, by applying time constants to at least one of the alphanumeric keys (to disable selection upon a tapping gesture when inadvertent tapping may be likely) or the cursor control device (to enable the tap filter for selection only after manipulation of the cursor).

As another perfecting feature of the invention affording particular convenience for "dragging" operations alluded to above, upon detection of cursor motion or control to produce the same while selection continues, the running average Zra can be reduced as indicated at Zra' in FIG. 8. The reduction may be in a single increment as shown or may increase over time (e.g. in a more or less linear or exponential fashion), as may be desired. Implementation with a subtractor, reference voltage or the like is generically depicted at 221 of FIG. 11.

Such a reduction in the running average value by which deselection is preferably discriminated as discussed above allows reliability of the "dragging" operation to be increased by reducing the z force value which will be recognized as a release or deselection and thus avoid losing contact with the object or image portion being "dragged". Zra' can be restored to the value of Zra at the time of selection (t4) upon detection of deselection (at tn).

Yet another perfecting feature of the invention, since it has been found in practice that a "press" gesture may proceed relatively slowly, determination of the point of onset of selection is preferably performed by determination or, more properly, estimation of the point of maximum curvature of a graphical representation of the value of Z. For comparison, in the embodiment discussed above in regard to FIG. 1, a period of relative stability of the value of the z signal was effectively required since the time of onset of selection was determined by locating such a period by scanning through values of Z contained in FIFO buffer 14. If the point of maximum curvature is estimated or determined, such a period of relative stability is not required.

Figure 12:
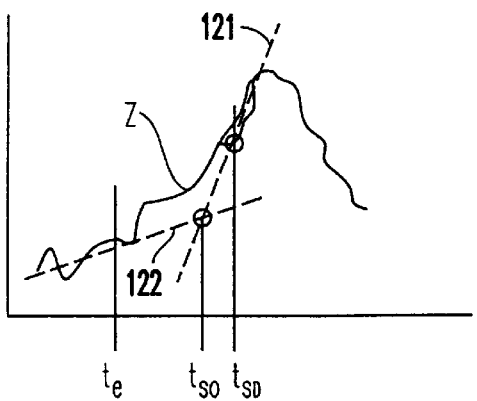

Specifically, as illustrated at 223 of FIG. 11, it is a relatively simple matter to maintain a brief historical record of recent values of increments of Z or, preferably, increments of Zra in a buffer (e.g. a FIFO buffer similar to 14) 225. As shown in FIG. 12, when a selection is discriminated at time $t_{SD}$ it is a similarly simple matter to extract the surrounding increments of Z or, preferably, increments of Zra for several sampling periods to approximate a slope of Z at the time of selection and to similarly extract increments of Z or Zra at a shortly preceding time, $t_e$. These increments will respectively represent a slope of lines 121, 122, fit through the values of Z at each of these points in time, $t_e$ and $t_{SD}$. Extrapolating values of z along these lines will reveal an intersection which will approximate the time $t_{SO}$ of the maximum curvature of a "noise-reduced" plot of values of Z even though the value of samples of Z may substantially diverge from the value of Z at the intersection of lines 121, 122. Time $t_{SO}$, thus determined, can be considered as the time of onset of the selection and used as a time stamp to access a corresponding entry in FIFO buffer 14 to obtain the x and y values for correction for motion of the cursor control device to thus improve selection location accuracy as well as discriminating among plural potential selections as discussed above.

In view of the foregoing, it is seen that an arrangement has been provided which allows the omission of a separate sensor or switch for selection but provides reliable separation of position specification and selection functions as well as corrections of unintentional changes of the position specified during selection and deselection while improving accommodation of the user and providing multiple selection functions. The arrangement and method fully supports image manipulation functions which include change of specified cursor location during selection, such as for "dragging".

While the invention has been described in terms of a single preferred embodiment, those skilled in the art will recognize that the invention can be practiced with modification within the spirit and scope of the appended claims.

Having thus described my invention, what we claim as new and desire to secure by Letters Patent is as follows:

1. A graphic input arrangement including
    a cursor control means,
    a graphic input means including means for developing first, second and third respective signals, at least two of said first, second and third respective signals representing forces applied to a graphic input device along orthogonal axes, and supplying said at least two of said first, second and third signals to said cursor control means,
    storing means for storing at least one of said first, second and third signals,
    filter means for discriminating a motion of said graphic input means corresponding to a selection from among a plurality of possible selections,
    means for discriminating between ones of said plurality of possible selections, and
    means responsive to said filter means for developing a position correction signal corresponding to one of said first, second and third signals stored in said storing means to relocate a cursor at a location where said cursor was located at a time when said motion corresponding to a selection was begun.

2. An arrangement as recited in claim 1, wherein said means for discriminating between ones of said plurality of possible selections includes
    means responsive to magnitude and direction of said position correction signal for discriminating between said possible selections by direction of force applied to said graphic input means.

3. An arrangement as recited in claim 2, wherein said means responsive to magnitude and direction of said position correction signal includes
    means for adaptively capturing motions of a user corresponding to respective ones of said plurality of possible selections.

4. An arrangement as recited in claim 1, further including
    means responsive to said means for discriminating between ones of said plurality of possible selections for developing signals corresponding to actuations of mouse buttons for respective ones of said plurality of possible selections.

5. An arrangement as recited in claim 2, further including
    means responsive to said means for discriminating between ones of said plurality of possible selections for developing signals corresponding to actuations of mouse buttons for respective ones of said plurality of possible selections.

6. An arrangement as recited in claim 3, further including means responsive to said means for discriminating between ones of said plurality of possible selections for developing signals corresponding to actuations of mouse buttons for respective ones of said plurality of possible selections.

7. An arrangement as recited in claim 1, wherein said filter means includes means for computing a running average of samples of a signal of said first, second and third signals.

8. An arrangement as recited in claim 7, further including means for determining a selection when a sample of said signal of said first, second and third signals exceeds said running average by a threshold amount.

9. An arrangement as recited in claim 7, further including means for determining a deselection after a selection when a sample of said signal of said first, second and third signals falls below a value of said running average.

10. An arrangement as recited in claim 9, further including means for reducing said value of said running average during selection.

11. An arrangement as recited in claim 1, further including means for approximating a time of onset of said selection by determining rates of change of a component of force applied to said graphic input device at a time of said discriminating of said selection and a time prior to said discriminating of said selection.

12. An arrangement as recited in claim 1, wherein said filter means further comprises means for detecting a substantial removal of force applied to said graphical input device.

13. An arrangement as recited in claim 1, wherein said filter means further includes a tap filter.

14. An arrangement as recited in claim 13, further including means for selectively disabling said tap filter.

15. A graphic input arrangement including a cursor control means, a graphic input means including means for developing first, second and third respective signals, at least two of said first, second and third respective signals representing forces applied to a graphic input device along orthogonal axes, and supplying said at least two of said first, second and third signals to said cursor control means, storing means for storing at least one of said first, second and third signals, filter means for discriminating a motion of said graphic input means corresponding to a selection, said filter means including means for computing a running average of samples of a signal of said first, second and third signals, and means responsive to said filter means for developing a position correction signal corresponding to one of said first, second and third signals stored in said storing means to relocate a cursor at a location where said cursor was located at a time when said motion corresponding to a selection was begun.

16. An arrangement as recited in claim 15, further including means for determining a selection when a sample of said signal of said first, second and third signals exceeds said running average by a threshold amount.

17. An arrangement as recited in claim 15, further including means for determining a deselection after a selection when a sample of said signal of said first, second and third signals falls below a value of said running average.

18. An arrangement as recited in claim 17, further including means for reducing said value of said running average during selection.

19. An arrangement as recited in claim 15, further including means for approximating a time of onset of said selection by determining rates of change of a component of force applied to said graphic input device at a time of said discriminating of said selection and a time prior to said discriminating of said selection.

20. An arrangement as recited in claim 15, wherein said filter means further comprises means for detecting a substantial removal of force applied to said graphical input device.

21. An arrangement as recited in claim 15, wherein said filter means further includes a tap filter.

22. An arrangement as recited in claim 21, further including means for selectively disabling said tap filter.

23. A method of controlling an image on a display including the steps of storing samples of an output of a graphic input means, discriminating occurrences of a selection among a plurality of possible selections and deselection of a location with said graphic input means, including discriminating between respective ones of said plurality of possible selections determining onset of motion of said graphic input device discriminated as a selection by said discriminating step, and generating corrections to said output of said graphic input means corresponding to a stored sample of an output of said graphic input means at a time of onset of selection discriminated in said discriminating step.

24. A method as recited in claim 23, including the further step of discriminating between possible selections in accordance with a direction of force applied to said graphic input means.

25. A method as recited in claim 23, including the further step of computing a running average of samples of an output of said graphic input means.

26. A method as recited in claim 25, including the further step of detecting a selection upon a value of a sample of said output of said graphic input means exceeding said running average by a threshold amount.

27. A method as recited in claim 25, including the further step of discriminating a deselection when a value of a sample of said output of said graphic input means is less than a value of said running average.

28. A method as recited in claim 27, including the further step of inhibiting computation of said running average during a period after discrimination of a selection.

29. A method as recited in claim 27, including the further step of reducing said value of said value of said running average.

30. A method as recited in claim 23, including the further step of estimating a time of said onset of selection in response to a rate of change with time of values of samples of said signal at a time of discrimination of a selection and a time prior to said time of discrimination of a selection.

31. A method as recited in claim 23, including the further step of detection of removal of a force from said graphic input means.

32. A method as recited in claim 23, including the further step of detecting a momentary application of force to said graphic input device after a period of applying substantially no force to said graphic input device.

* * * * *